United States Patent
Nakajima

[19]

[11] Patent Number: 5,946,223
[45] Date of Patent: Aug. 31, 1999

[54] SUBTRACTION/SHIFT-TYPE DIVIDING DEVICE PRODUCING A 2-BIT PARTIAL QUOTIENT IN EACH CYCLE

[75] Inventor: Masaitsu Nakajima, Osaka, Japan

[73] Assignee: Matsushita Electric Industrial Co. Ltd., Osaka, Japan

[21] Appl. No.: 08/767,083

[22] Filed: Dec. 6, 1996

[30] Foreign Application Priority Data

Dec. 8, 1995 [JP] Japan ................................ 7-320157

[51] Int. Cl.[6] ....................................................... G06F 7/52
[52] U.S. Cl. ............................................................ 364/766
[58] Field of Search ........................... 364/736.01, 748.1, 364/748.11, 761–766

[56] References Cited

U.S. PATENT DOCUMENTS 5,481,745  1/1996  Tatsumi ..................................... 364/761
5,485,414  1/1996  Yao et al. ................................. 364/766
5,493,523  2/1996  Huffman ................................... 364/766
5,517,439  5/1996  Suzuki et al. ............................ 364/766

*Primary Examiner*—Emmanuel L. Moise
*Attorney, Agent, or Firm*—Pearne, Gordon, McCoy & Granger LLP

[57] ABSTRACT

A first subtracting means subtracts divisor data from dividend data or partial remainder data. In parallel with the subtraction of the first subtracting means, a comparing means performs a comparison between the highest-3-bit data of the dividend or partial remainder data and that of the divisor data. A first selecting means supplies, after shifting leftward by one bit, the dividend data or partial remainder data, or output data of the first subtracting means to a second subtracting means in accordance with a comparison result of the comparing means. A 2-bit partial quotient is determined based on the comparison result of the comparing means and subtraction results of the first and second subtracting means. As a result, the critical path is simplified and hence the delay time is shortened.

9 Claims, 2 Drawing Sheets

//////

SUBTRACTION/SHIFT-TYPE DIVIDING DEVICE PRODUCING A 2-BIT PARTIAL QUOTIENT IN EACH CYCLE

BACKGROUND OF THE INVENTION

1. Field of the Invention

The present invention relates to a dividing device which is incorporated in a digital arithmetic device and executes a division on input, normalized divisor data and dividend data so as to produce a 2-bit partial quotient in each cycle.

2. Description of the Related Art

In recent years, the progress of the semiconductor technologies has enabled more than millions of transistors to be integrated in a single chip. Now it is common to incorporate many blocks each having a very complex arithmetic function in a single VLSI. Also digital arithmetic devices incorporate various kinds of units such as a fixed-point adder, subtracter, multiplier, and divider, and a logical operation unit as well as a floating-point adder, subtracter, multiplier, and divider. The technologies are advancing not only in the degree of integration but also in processing speed, which is becoming increasingly high.

In such digital arithmetic devices, dividing devices to be incorporated in VLSIs are generally classified into two types: the first type executes a convergence-type division by repetitive multiplications, and the second type executes a subtraction/shift-type division. The first type dividing device, which needs a multiplier, can be implemented with almost no increase in hardware if a VLSI incorporates a multiplier. However, in this type of dividing device, it is difficult to increase the processing speed. If a VLSI incorporates no multiplier, a multiplier needs to be provided for the division, which will cause a problem in hardware cost. On the other hand, although the second type of dividing device can increase the processing speed to a certain extent by increasing the amount of hardware, the processing speed cannot be increased in a simple manner.

Examples of subtraction/shift-type dividing devices are described in Kai Hwang: "Computer Arithmetic Principles, Architecture, and Design."

SUMMARY OF THE INVENTION

An object of the present invention is to provide a high-speed dividing device.

Another object of the invention is to provide a dividing device which executes a division at high speed by reducing the delay time by simplifying the critical path.

According to the invention, there is provided a dividing device which executes a division on input, normalized dividend data and divisor data so as to produce a 2-bit partial quotient in each cycle, the dividing device comprising first data holding means for receiving and holding the dividend data or partial remainder data; second data holding means for receiving and holding the divisor data; first subtracting means for subtracting output data of the second data holding means from output data of the first data holding means; comparing means for comparing highest-N-bit data of the output data of the first data holding means with that of the output data of the second data holding means; first selecting means for outputting, after shifting leftward by one bit, output data of the first subtracting means or the output data of the first data holding means in accordance with a comparison result of the comparing means; second subtracting means for subtracting the output data of the second data holding means from output data of the first selecting means; second selecting means for outputting, after shifting leftward by two bits, the output data of the first subtracting means or the output data of the first data holding means in accordance with a subtraction result of the first subtracting means; and third selecting means for outputting, as the partial remainder data, output data itself of the second selecting means or output data of the second subtracting means which is shifted leftward by one bit in accordance with a subtraction result of the first or second subtracting means.

With the above configuration, the critical path that determines the processing speed is shortened to (subtraction in first subtracting means)+(data passage through first selecting means)+(subtraction in second subtracting means)+(data selection in third selecting means)+(data passage through third selecting means). As a result, a high-speed dividing device can be realized.

DESCRIPTION OF THE PREFERRED EMBODIMENTS

A subtraction/shift-type dividing device according to a first embodiment of the present invention will be hereinafter described with reference to FIG. 1.

Figure 1:
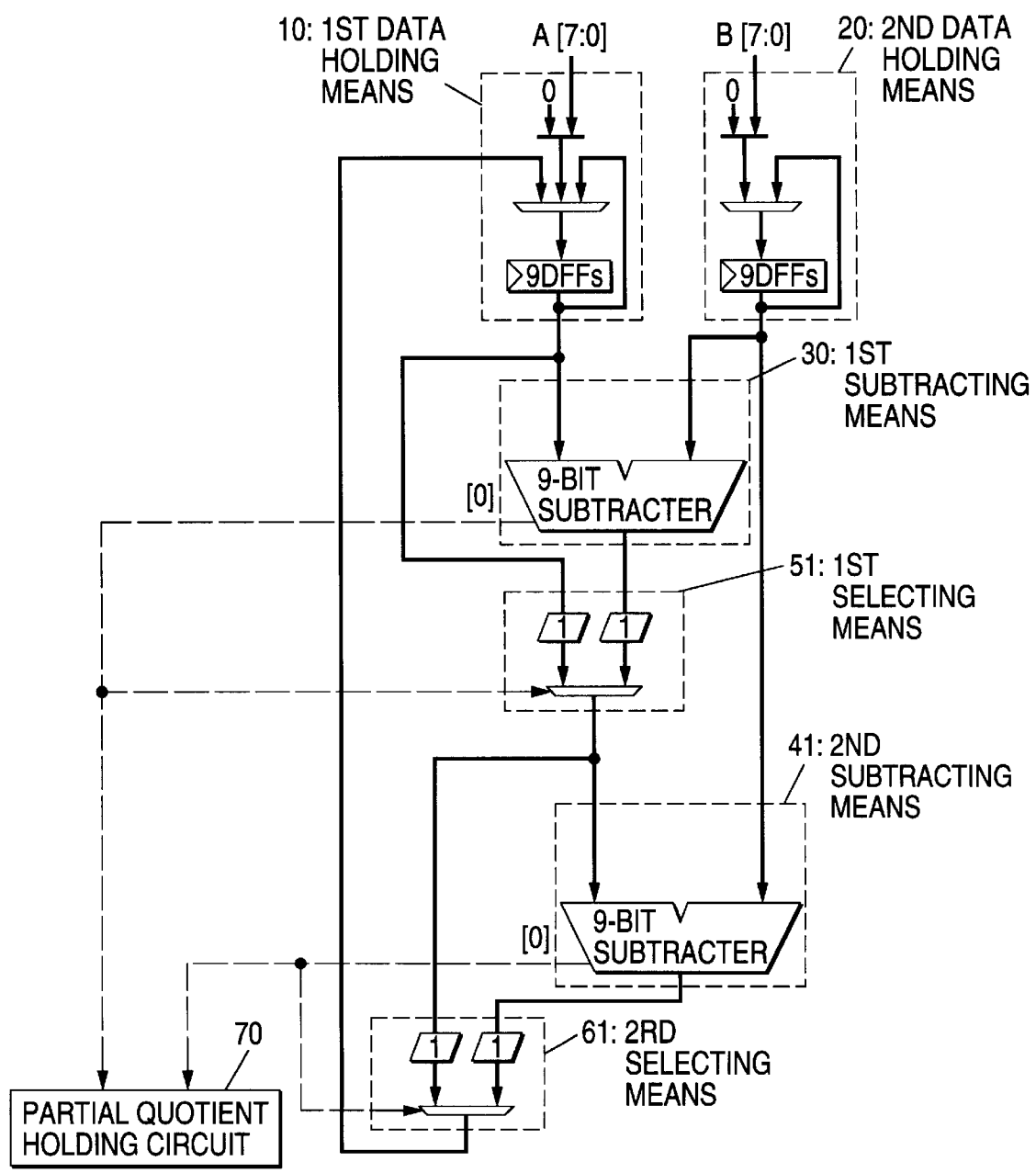
FIG. 1 shows the configuration of a dividing device according to a first embodiment of the present invention.

FIG. 1 shows the configuration of a subtraction/shift-type dividing device which executes a division on input, normalized divisor data and dividend data so as to produce a 2-bit partial quotient in each cycle. Each of the two input data, i.e., dividend data A[7:0] and divisor data B[7:0], is normalized data having an 8-bit data width. Since both dividend data and divisor data are normalized, the MSBs A[7] and B[7] are always "1."

In FIG. 1, reference numeral 10 denotes a first data holding means which receives and holds the dividend data A[7:0] at the time of data input or partial remainder data during execution of a division. The first data holding means 10 holds 9-bit-width data. In the case of receiving the dividend data A[7:0], the first data holding means 10 holds 9-bit-width data by adding 1-bit data "0" as the MSB.

Reference numeral 20 denotes a second data holding means for holding the divisor data B[7:0]. The second data holding means 20 also holds 9-bit-width data by adding 1-bit data "0" as the MSB. The second data holding means 20 continues to hold this data during execution of a division.

Reference numeral 30 denotes a first subtracting means which subtracts output data of the second data holding means 20 from output data of the first data holding means 10, and outputs resulting data. The first subtracting means 30 is a 9-bit subtracter. A function equivalent to the above is obtained even in a case where the second data holding means 20 is given an 8-bit configuration and the first subtracting means 30 executes a subtraction after adding 1-bit data "0" to the output data of the second data holding means 20 as the MSB.

Reference numeral 51 denotes a first selecting means which shifts leftward by one bit output data of the first subtracting means 30 or the output data of the first data holding means 10 in accordance with the subtraction result of the first subtracting means 30, and outputs the shifted data. More specifically, if the subtraction result of the first subtracting means 30 is positive or zero, the first selecting means 51 shifts leftward by one bit the output data of the first subtracting means 30. If the subtraction result is negative, the first selecting means 51 shifts leftward by one bit the output data of the first data holding means 10.

Reference numeral 41 denotes a second subtracting means which subtracts the output data of the second data holding means 20 from output data of the first selecting means 51, and outputs resulting data. The first subtracting means 41 is a 9-bit subtracter.

Reference numeral 61 denotes a second selecting means which shifts leftward by one bit output data of the second subtracting means 41 or the output data of the first selecting means 51 in accordance with the subtraction result of the second subtracting means 41, and outputs the shifted data. More specifically, if the subtraction result of the second subtracting means 41 is negative, the second selecting means 61 shifts leftward by one bit the output data of the first data selecting means 51. In the other cases, the second selecting means 61 shifts leftward by one bit the output data of the second subtracting means 41.

A partial quotient holding circuit 70 holds a partial quotient that is generated in accordance with the subtraction results of the first subtracting means 30 and the second subtracting means 41. More specifically, the partial quotient holding circuit 70 holds a partial quotient "1" when the subtraction result of the first subtracting means 30 or the second subtracting means 41 is positive or zero. On the other hand, the partial quotient holding circuit 70 holds a partial quotient "0" when the subtraction result of the first subtracting means 30 or the second subtracting means 41 is negative. In this manner, a 2-bit partial quotient is generated in each cycle in accordance with the subtraction results of the two subtracting means 30 and 41. The partial quotient holding circuit 70 can easily be implemented by a 2-bit-input shift register or a register having an input data selecting function.

The operation of the above-configured dividing device will be described below.

First, normalized dividend data A[7:0] is input to the first data holding means 10 and normalized divisor data B[7:0] is input to the second data holding means 20. Since both data are normalized, each of the MSBs A[7] and B[7] is "1." In this state, the execution of a division is started. After a 2-bit partial quotient is generated in each cycle, output data of the second selecting means 61 is supplied, as partial remainder data, to the first data holding means 10 and held therein. A quotient of 2N bits can be obtained by performing this cycle N times.

The operation will be described in further detail for each of combinations of partial quotients generated in one cycle, i.e., "00," "01," "10," and "11." Since the input divisor data held by the second data holding means 20 is kept unaltered, the bit [7] is always "1." However, since the first data holding means 10 fetches partial remainder data, the bit [7] of the data held by the first data holding means 10 is not always "1." Further, the bit [8] may have data "1."

1) Example generating partial quotient "00"

| | |
|---|---|
| Minuend that is input to first subtracting means | 000100000 |
| Subtrahend that is input to first subtracting means | 010000000 |
| Subtraction result of first subtracting means | 110100000 |
| | (−001100000) → Negative |
| Output of first selecting means | 001000000 |
| Minuend that is input to second subtracting means | 001000000 |
| Subtrahend that is input to second subtracting means | 010000000 |
| Subtraction result of second subtracting means | 111000000 |
| | (−001000000) → Negative |
| Output of second selecting means | 010000000 |

2) Example generating partial quotient "01"

| | |
|---|---|
| Minuend that is input to first subtracting means | 001100000 |
| Subtrahend that is input to first subtracting means | 010000000 |
| Subtraction result of first subtracting means | 111100000 |
| | (−000100000) → Negative |
| Output of first selecting means | 011000000 |
| Minuend that is inputto second subtracting means | 011000000 |
| Subtrahend that is input to second subtracting means | 010000000 |
| Subtraction result of second subtracting means | 001000000 |
| | (+001000000) → Positive |
| Output of second selecting means | 010000000 |

3) Example generating partial quotient "10"

| | |
|---|---|
| Minuend that is input to first subtracting means | 010100000 |
| Subtrahend that is input to first subtracting means | 010000000 |
| Subtraction result of first subtracting means | 000100000 |
| | (−000100000) → Positive |
| Output of first selecting means | 001000000 |
| Minuend that is input to second subtracting ineans | 001000000 |
| Subtrahend that is input to second subtracting means | 010000000 |
| Subtraction result of second subtracting means | 111000000 |
| | (−001000000) → Negative |
| Output of second selecting means | 010000000 |

4) Example generating partial quotient "11"

| | |
|---|---|
| Minuend that is input to first subtracting means | 011100000 |
| Subtrahend that is input to first subtracting means | 010000000 |
| Subtraction result of first subtracting means | 001100000 |
| | (−001100000) → Positive |
| Output of first selecting means | 011000000 |
| Minuend that is input to second subtracting means | 011000000 |
| Subtrahend that is input to second subtracting means | 010000000 |
| Subtraction result of second subtracting means | 001000000 |
| | (−001000000) → Positive |
| Output of second selecting means | 010000000 |

In the above manner, a 2-bit partial quotient is obtained in each cycle in accordance with subtraction results of the first and second subtracting means 30 and 41. A partial quotient that is generated when the subtraction result of the first subtracting means 30 or the second subtracting means 41 is "0" is the same as when the subtraction result is "1."

In the above dividing device, the critical path that determines the processing speed is (subtraction in first subtracting means 10)+(data selection in first selecting means 51)+(data passage through first selecting means 51)+(subtraction in second subtracting means 41)+(data selection in second selecting means 61)+(data passage through second selecting means 61).

A dividing device according to a second embodiment of the invention will be hereinafter described with reference to FIG. 2.

Figure 2:
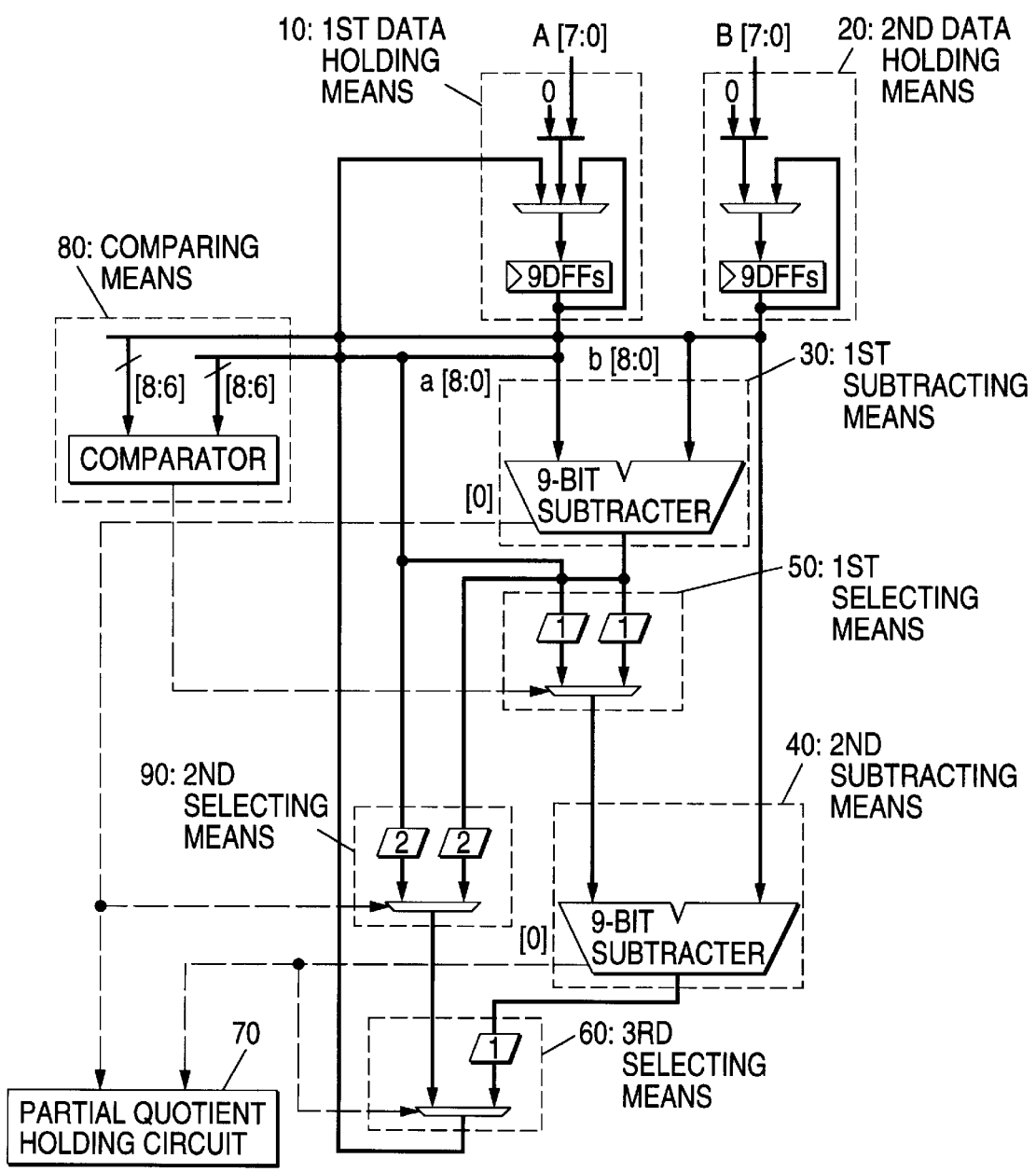
FIG. 2 shows the configuration of a dividing device according to a second embodiment of the invention.

FIG. 2 shows the configuration of a subtraction/shift-type dividing device which executes a division on input, normalized divisor data and dividend data so as to produce a 2-bit partial quotient in each cycle. Each of the two input data, i.e., dividend data A[7:0] and divisor data B[7:0], is normalized data having an 8-bit data width. Since both dividend data and divisor data are normalized, the MSBs A[7] and B[7] are always "1."

In FIG. 2, reference numeral 10 denotes a first data holding means which receives and holds the dividend data A[7:0] at the time of data input or partial remainder data during execution of a division. The first data holding means 10 holds 9-bit-width data. In the case of receiving the dividend data A[7:0], the first data holding means 10 holds 9-bit-width data by adding 1-bit data "0" as the MSB.

Reference numeral 20 denotes a second data holding means for holding the divisor data B[7:0]. The second data holding means 20 also holds 9-bit-width data by adding 1-bit data "0" as the MSB. The second data holding means 20 continues to hold this data during execution of a division.

Reference numeral 30 denotes a first subtracting means which subtracts output data of the second data holding means 20 from output data of the first data holding means 10, and outputs resulting data. The first subtracting means 30 is a 9-bit subtracter. A function equivalent to the above is obtained even in a case where the second data holding means 20 is given an 8-bit configuration and the first subtracting means 30 executes a subtraction after adding 1-bit data "0" to the output data of the second data holding means 20 as the MSB.

Reference numeral 80 denotes a comparing means which compares the highest-3-bit data of the output data of the first data holding means 10 with that of the second data holding means 20, and outputs a comparison result. A function equivalent to the above is obtained even in a case where the second data holding means 20 is given an 8-bit configuration and the comparing means 80 compares the two highest-3-bit data after adding 1-bit data "0" to the output data of the second data holding means 20 as the MSB.

Reference numeral 50 denotes a first selecting means which shifts leftward by one bit output data of the first subtracting means 30 or the output data of the first data holding means 10 in accordance with the comparison result of the comparing means 80, and outputs the shifted data. More specifically, the first selecting means 50 shifts leftward by one bit the output data of the first subtracting means 30 only when the highest-3-bit data of the output data of the first data holding means 10 is larger than that of the second data holding means 20. In the other cases, the first selecting means 50 shifts leftward by one bit the output data of the first data holding means 10.

Reference numeral 40 denotes a second subtracting means which subtracts the output data of the second data holding means 20 from output data of the first selecting means 50, and outputs resulting data.

Reference numeral 90 denotes a second selecting means which shifts leftward by 2 bits the output data of the first subtracting means 30 or the output data of the first data holding means 10 in accordance with the subtraction result of the first subtracting means 30, and outputs the shifted data. More specifically, if the subtraction result of the first subtracting means 30 is positive or zero, the second selecting means 61 shifts leftward by 2 bits the output data of the first subtracting means 30. In the subtraction result is negative, the second selecting means 90 shifts leftward by 2 bits the output data of the first data holding means 10.

Reference numeral 60 denotes a third selecting means which outputs output data of the second subtracting means 40 after shifting it leftward by one bit or outputs output data itself of the second selecting means 90 in accordance with the subtraction result of the second subtracting means 40. More specifically, if the subtraction result of the second subtracting means 40 is negative, the third selecting means 60 outputs the output data of the second data selecting means 90 without shifting. In the other cases, the third selecting means 60 shifts leftward by one bit the output data of the second subtracting means 40 and outputs the shifted data.

A partial quotient holding circuit 70 holds a partial quotient that is generated in accordance with the subtraction results of the first subtracting means 30 and the second subtracting means 40. More specifically, the partial quotient holding circuit 70 holds a partial quotient "1" when the subtraction result of the first subtracting means 30 or the second subtracting means 40 is positive or zero. On the other hand, the partial quotient holding circuit 70 holds a partial quotient "0" when the subtraction result of the first subtracting means 30 or the second subtracting means 40 is negative. In this manner, a 2-bit partial quotient is generated in each cycle in accordance with the subtraction results of the two subtracting means 30 and 40. The partial quotient holding circuit 70 can easily be implemented by a 2-bit-input shift register or a register having an input data selecting function.

The operation of the above-configured dividing apparatus will be described below.

First, normalized dividend data A[7:0] is input to the first data holding means 10 and normalized divisor data B[7:0] is input to the second data holding means 20. Since both data are normalized, each of the MSBs A[7] and B[7] is "1." In this state, the execution of a division is started. Now, let a[8:0] and b[8:0] represent dividend/partial remainder data that is output from the first data holding means 10 and divisor data that is output from the second data holding means 20, respectively. The set of data a[8:0] and b[8:0] is supplied to the first subtracting means 30 and the comparing means 80 at the same time.

The first subtracting means 30 executes a subtraction a[8:0]−b[8:0] and outputs a subtraction result. The comparing means 80 compares the highest-3-bit data a[8:6] of the dividend/partial remainder data that is output from the first data holding means 10 with the highest-3-bit data b[8:6] of the divisor data that is output from the second data holding means 20.

Next, the first selecting means 50 is controlled in accordance with a comparison result of the comparing means 80. The comparison result should be one of the following three cases:

1) a[8:6]>b[8:6]
2) a[8:6]<b[8:6]
3) a[8:6]=b[8:6]

The ensuing operation will be hereinafter described in detail for each of the three cases.

In case 1), since the relationship a[8:0]>b[8:0] is always established as is apparent from the comparison result of the comparing means 80, it is known that the subtraction a[8:0]−b[8:0] produces a positive value even before it is completed in the first subtracting means 30. Therefore, the first-bit partial quotient should be "1." Since the subtraction result of the first subtracting means 30 is positive, it is necessary to supply the second subtracting means 40 with output data of the first subtracting means 30 after shifting it leftward by one bit. Therefore, the first selecting means 50 is so controlled as to shift the subtraction result of the first subtracting means 30 leftward by one bit and supply the shifted data to the second subtracting means 40. The second selecting means 90 is controlled in accordance with the subtraction result of the first subtracting means 30. In the case under consideration where the subtraction result of the first subtracting means 30 is positive, the second selecting means 90 shifts leftward by two bits the output data of the first subtracting means 30 and outputs the shifted data. The third selecting means 60 is controlled in accordance with the subtraction result of the second subtracting means 40. If the subtraction result of the second subtracting means 40 is positive or zero, the third selecting means 60 shifts leftward by one bit the output data of the second subtracting means 40 and outputs the shifted data. If it is negative, the third selecting means 60 outputs the output data of the second selecting means 90. As a result of the above operation, in case 1), a partial quotient "10" or "11" is generated.

In case 2), since the relationship a[8:0]<b[8:0] is always established as is apparent from the comparison result of the comparing means 80, it is known that the subtraction a[8:0]−b[8:0] produces a negative value even before it is completed in the first subtracting means 30. Therefore, the first-bit partial quotient should be "0." Since the subtraction result of the first subtracting means 30 is negative, it is necessary to supply the second subtracting means 40 with the output data of the first data holding means 10 after shifting it leftward by one bit. Therefore, the first selecting means 50 is so controlled as to shift the output data of the first data holding means 30 leftward by one bit and supply the shifted data to the second subtracting means 40. The second selecting means 90 is controlled in accordance with the subtraction result of the first subtracting means 30. In the case under consideration where the subtraction result of the first subtracting means 30 is negative, the second selecting means 90 shifts leftward by two bits the output data of the first subtracting means 30 and outputs the shifted data. The third selecting means 60 is controlled in accordance with the subtraction result of the second subtracting means 40. If the subtraction result of the second subtracting means 60 is positive or zero, the third selecting means 60 shifts leftward by one bit the output data of the second subtracting means 40 and outputs the shifted data. If it is negative, the third selecting means 60 outputs the output data of the second selecting means 90. As a result of the above operation, in case 2), a partial quotient "00" or "01" is generated.

In case 3), the subtraction result of the first subtracting means 30 becomes positive, zero, or negative. That is, the subtraction result becomes one of a positive value, zero, and a negative value when a[5:0]>b[5:0], a[5:0]=b[5:0], and a[5:0]<b[5:0], respectively. Therefore, the first-bit partial quotient cannot be determined from the comparison result of the comparing means 80. However, the combination of 2-bit quotients can be restricted by utilizing the fact that the divisor data b[8:0] supplied from the second data holding means 20 is normalized. Since the data b[8:6] is the highest-3-bit data of the normalized divisor data, it can be only "010" or "011." The combination of the data a and b will be described below in detail for these two cases.

If the highest-3-bit data is "010," the maximum value and the minimum value of the 9-bit data are "010111111" and "010000000," respectively. When the data a takes the maximum value and the data b takes the minimum value, a partial quotient "10" is obtained as a result of the following two subtractions.

```
  010111111
 −010000000
  ─────────
  000111111  (Positive) → Partial quotient "1"

001111110  (Shifting subtraction result leftward by one bit)
 −010000000
  ─────────
 −000000010  (Negative) → Partial quotient "0"
```

When the data a takes the minimum value and the data b takes the maximum value, a partial quotient "01" is obtained as a result of the following two subtractions.

```
  010000000
 −010111111
  ─────────
  000111111  (Negative) → Partial quotient "0"

100000000  (Shifting output data of first data holding
             means leftward by one bit)
 −010111111
  ─────────
 −001000001  (Positive) → Partial quotient "1"
```

Next, if the highest-3-bit data is "011," the maximum value and the minimum value of the 9-bit data are "011111111" and "011000000," respectively. When the data a takes the maximum value and the data b takes the minimum value, a partial quotient "10" is obtained as a result of the following two subtractions.

```
  011111111
 −011000000
  ─────────
  000111111  (Positive) → Partial quotient "1"

001111110  (Shifting subtraction result leftward by one bit)
 −011000000
  ─────────
 −001000010  (Negative) → Partial quotient "0"
```

When the data a takes the minimum value and the data b takes the maximum value, a partial quotient "01" is obtained as a result of the following two subtractions.

```
  011000000
 −011111111
  ─────────
  000111111  (Negative) → Partial quotient "0"

110000000  (Shifting output data of first data holding
             means leftward by one bit)
 −011111111
  ─────────
 −010000010  (Positive) → Partial quotient "1"
```

When a=b, a partial quotient "10" is obtained as a result of the following two subtractions, irrespective of the value of the data a and b.

```
   01*******
  -01*******
  ─────────
   000000000    (0) → Partial quotient "1"

000000000    (Shifting subtraction result leftward by one bit)
  -011000000
  ──────────
  -011000000    (Negative) → Partial quotient "0"
```

As is understood from the above description, when the comparison result of the comparing means 80 indicates a[8:6]=b[8:6] (case 3)), the combination of partial quotients can be restricted to "10" and "01." That is, if the subtraction result of the first subtracting means 30 is positive or zero, a partial quotient "10" is obtained. If it is negative, a partial quotient "01" is obtained. The whole subtraction can be executed without causing any discrepancy by generating partial remainder data that is consistent with the above results.

When the partial quotient is "10," partial remainder data is obtained by shifting the output data itself of the first subtracting means 30 leftward by two bits. When the partial quotient is "01," partial remainder data is obtained by inputting the output data of the first data holding means 10 after shifting it leftward by one bit, and then shifting the output data of the second subtracting means 40 leftward by one bit. These two kinds of data can be output from the third selecting means 60 without causing any inconsistency with the partial quotient by controlling the first selecting means 50 so that it shifts the output data of the first data holding means 10 leftward by one bit and outputs the shifted data and controlling the second selecting means 90 so that it shifts the output data of the first subtracting means 30 leftward by two bits and outputs the shifted data, as well as controlling the third selecting means 60 in accordance with the subtraction result of the second subtracting means 40.

In summary, when the comparison result of the comparing means 80 indicates a[8:6]=b[8:6] (case 3)), the division can be executed without causing any discrepancy by controlling the first selecting means 50 so that it supplies the output data of the first data holding means 10 to the second subtracting means 40 after shifting it leftward by one bit, and controlling the second selecting means 90 so that it shifts the output data of the first subtracting means 30 leftward by two bits and supplies the shifted data to the third selecting means 60 if the subtraction result of the first subtracting means 30 is positive or zero, and it shifts the output data of the first data holding means 10 leftward by two bits and supplies the shifted data to the third selecting means 60 if the subtraction result of the first subtracting means 30 is negative.

As a modification of the above operation, when the comparison result of the comparing means 80 indicates a[8:6]=b[8:6] (case 3)), the 2-bit partial quotient may be determined in accordance with the subtraction result of the second subtracting means 40 rather than the first subtracting means 40. Further, the third selecting means 60, which outputs the partial remainder data, may be controlled in accordance with the subtraction result of the first subtracting means 30 rather than the second subtracting means 40.

As the dividing device operates in the above manner, 2-bit partial quotient data is generated in each cycle and the output data of the third selecting means 60 is supplied, as partial remainder data, to the first data holding data 10 and stored therein. A 2N-bit quotient is obtained by performing the above cycle N times.

A description will now be made of the critical path which determines the delay and processing speed in performing the above operation. First, the path for generating a partial quotient will be examined. A partial remainder with a partial quotient "10" is generated along a path of first subtracting means 30→second selecting means 90→third selecting means 60. A partial remainder with a partial quotient "01" is generated along a path of first selecting means 50→second subtracting means 40→third selecting means 60. The term "path" as used herein means a flow of data in which the origins are the first and second data holding means 10 and 12.

From the same viewpoint as in the above, paths of partial remainders with respective partial quotients will be summarized below for each comparison result of the comparing means 80.

1) a[8:6]>b[8:6]
   Path of partial remainder with partial quotient "10"
      First subtracting means 30→second selecting means 90→third selecting means 60
   Path of partial remainder with partial quotient "11"
      First subtracting means 30→first selecting means 50→second subtracting means 40→third selecting means 60

2) a[8:6]<b[8:6]
   Path of partial remainder with partial quotient "00"
      Second subtracting means 40→third selecting means 60
   Path of partial remainder with partial quotient "01"
      First selecting means 50→second subtracting means 40→third selecting means 60

3) a[8:6]=b[8:6]
   Path of partial remainder with partial quotient "10"
      First subtracting means 30→second selecting means 90→third selecting means 60
   Path of partial remainder with partial quotient "01"
      First selecting means 50→second subtracting means 40→third selecting means 60

The above paths relate to the flow of main data in generating a partial remainder. To evaluate the entire delay, it is necessary to consider the control flow and control the delay. Now, let respective delay elements be defined as follows:

D0: Comparison in comparing means 80
D1: Subtraction in first subtracting means 30
D2: Data selection in first selecting means 50
D3: Data passage through first selecting means 50
D4: Subtraction in second subtracting means 40
D5: Data selection in third selecting means 60
D6: Data passage through third selecting means 60
D7: Data selection in second selecting means 90
D8: Data passage through second selecting means 90

By using these definitions, the critical paths are written as follows:

1) a[8:6]>b[8:6]
   Critical path-1: D0→D2→D3→D4→D5→D6
   Critical path-2: D1→D3→D4→D5→D6
2) a[8:6]<b[8:6]
   Critical path-3: D0→D2→D3→D4→D5→D6
3) a[8:6]=b[8:6]
   Critical path-4: D0→D2→D3→D4→D5→D6
   Critical path-5: D1→D3→D4→D5→D6

Since the delay of the path D0→D2 is sufficiently shorter than that of the path D1, the most critical path in terms of delay is D1→D3→D4→D5→D6. This critical path is shorter than the critical path D1→D2→D3→D4→D5→D6 by D2. That is, the dividing device of this embodiment is faster than that of the first embodiment by D2.

As is apparent from the above description, in the dividing device of the second embodiment, the comparing means 80 compares the highest-3-bit data of dividend data with that of divisor data and the first selecting means 50 is controlled in accordance with the comparison result of the comparing means 80. As a result, the processing speed can be increased by reducing the critical path while correct execution of a division is assured.

What is claimed is:

1. A dividing device which executes a division on input, normalized dividend data and divisor data so as to produce a 2-bit partial quotient in each cycle, the dividing device comprising:

first data holding means for receiving and holding the dividend data or partial remainder data;

second data holding means for receiving and holding the divisor data;

first subtracting means for subtracting output data of the second data holding means from output data of the first data holding means;

comparing means for comparing highest-N-bit data of the output data of the first data holding means with that of the output data of the second data holding means;

first selecting means for outputting, after shifting leftward by one bit, output data of the first subtracting means or the output data of the first data holding means in accordance with a comparison result of the comparing means;

second subtracting means for subtracting the output data of the second data holding means from output data of the first selecting means;

second selecting means for outputting, after shifting leftward by two bits, the output data of the first selecting means or the output data of the first data holding means in accordance with a sign of a subtraction result of the first subtracting means; and third selecting means for outputting, as the partial remainder data, output data of the second subtracting means, which is shifted leftward by one bit, or output data of the second selecting means, in accordance with a subtraction result of the first or second subtracting means.

2. The dividing device according to claim 1, wherein said N is three.

3. The dividing device according to claim 2, wherein the first selecting means outputs the output data of the first subtracting means if the highest-3-bit data of the output data of the first data holding means is greater than that of the output data of the second data holding means, and outputs the output data of the first data holding means if the highest-3-bit data of the output data of the first data holding means is smaller than or equal to that of the output data of the second data holding means.

4. The dividing device according to claim 3, wherein when the highest-3-bit data of the output data of the first data holding means is equal to that of the output data of the second data holding means, the 2-bit partial quotient is determined in accordance with the subtraction result of the first subtracting means.

5. The dividing device according to claim 3, wherein when the highest-3-bit data of the output data of the first data holding means is equal to that of the output data of the second data holding means, the 2-bit partial quotient is determined in accordance with the subtraction result of the second subtracting means.

6. A dividing device which executes a division on input, normalized dividend data and divisor data so as to produce a 2-bit partial quotient in each cycle, the dividing device comprising:

first data holding means for receiving and holding the dividend data or partial remainder data;

second data holding means for receiving and holding the divisor data;

first subtracting means for subtracting output data of the second data holding means from output data of the first data holding means;

first selecting means for outputting, after shifting leftward by one bit, output data of the first subtracting means or the output data of the first data holding means in accordance with a sign of a subtraction result of the first subtracting means;

second subtracting means for subtracting the output data of the second data holding means from output data of the first selecting means; and second selecting means for outputting, as the partial remainder data, the output data of the second subtracting means, which is shifted leftward by one bit, or the output data of the first selecting means, which is shifted leftward by one bit, in accordance with a sign of a subtraction result of the second subtracting means.

7. A dividing device according to claim 6, wherein when said subtraction result of said first subtracting means is negative, said first selecting means outputs, after shifting leftward by one bit, the output data of said first data holding means.

8. A dividing device according to claim 7, wherein when said subtraction result of said second subtracting means is negative, said second selecting means outputs, after shifting leftward by one bit, the output data of said first selecting means.

9. A dividing device according to claim 6, wherein when said subtraction result of said second subtracting means is negative, said second selecting means outputs, after shifting leftward by one bit, the output data of said first selecting means.

* * * * *

UNITED STATES PATENT AND TRADEMARK OFFICE
CERTIFICATE OF CORRECTION

PATENT NO. : 5,946,223
DATED : August 31, 1999
INVENTOR(S) : Nakajima

It is certified that error appears in the above-identified patent and that said Letters Patent is hereby corrected as shown below:

Column 4, Line 21, delete "inputto" and insert --input to--.

Column 4, Line 39, delete "ineans" and insert --means--.

Column 8, Line 24, delete "000111111" and insert ---000111111--.

Column 8, Line 56, delete "000111111" and insert ---000111111--.

Column 8, Line 62, delete "-010000010" and insert ---010000001--.

Signed and Sealed this

Second Day of January, 2001

Attest:

Attesting Officer

Q. TODD DICKINSON

Commissioner of Patents and Trademarks